(12) United States Patent
McAree

(10) Patent No.: US 8,346,512 B2
(45) Date of Patent: Jan. 1, 2013

(54) COLLISION AVOIDANCE FOR ELECTRIC MINING SHOVELS

(75) Inventor: Ross McAree, Queensland (AU)

(73) Assignee: CMTE Development Limited, Pinjarra Hills, QLD (AU)

( * ) Notice: Subject to any disclaimer, the term of this patent is extended or adjusted under 35 U.S.C. 154(b) by 753 days.

(21) Appl. No.: 12/373,910

(22) PCT Filed: Aug. 6, 2007

(86) PCT No.: PCT/AU2007/001100
§ 371 (c)(1),
(2), (4) Date: Jan. 15, 2009

(87) PCT Pub. No.: WO2008/014571
PCT Pub. Date: Feb. 7, 2008

(65) Prior Publication Data
US 2010/0036645 A1 Feb. 11, 2010

(30) Foreign Application Priority Data
Aug. 4, 2006 (AU) .............................. 2006904285

(51) Int. Cl.
*G06F 17/50* (2006.01)
(52) U.S. Cl. .................. 703/1; 703/6; 700/56; 370/338; 701/117; 701/1; 701/470
(58) Field of Classification Search .................. 703/1, 6; 700/56; 370/338; 701/1, 117, 470
See application file for complete search history.

(56) References Cited

U.S. PATENT DOCUMENTS

| | | | |
|---|---|---|---|
| 5,375,059 A | 12/1994 | Kyrtsos et al. | |
| 5,610,815 A | 3/1997 | Gudat et al. | |
| 5,640,323 A | * 6/1997 | Kleimenhagen et al. | ......... 701/1 |
| 5,646,843 A | 7/1997 | Gudat et al. | |

(Continued)

FOREIGN PATENT DOCUMENTS

WO  WO01/11388  2/2001

OTHER PUBLICATIONS

"Robot Motion Planning", Jean-Claude Latombe, Kluwer Academic Publishers, Boston, MA, 1991.

(Continued)

*Primary Examiner* — Tejal Gami
(74) *Attorney, Agent, or Firm* — Barnes & Thornburg LLP

(57) ABSTRACT

Systems and methods for reducing the probability of a collision between a first object, whose trajectory is substantially controlled by an operator input command, and a second object. In one embodiment such a method includes receiving an operator input command indicative of first control data; generating model data indicative of a virtual construct of the physical environment proximal to the first object; processing the first control data to predict future dynamics of the first object in the environment; determining whether, on the basis of the predicted dynamics and the model data, the first object is predicted to collide with a second object in the environment; defining second control data for which the first object is not predicted to collide with the second object in the environment; and providing the second control data to a controller coupled to the first object such that the first object is controlled in accordance with the second control data for substantially avoiding the collision of the first object with the second object.

16 Claims, 6 Drawing Sheets

U.S. PATENT DOCUMENTS

| | | | |
|---|---|---|---|
| 5,956,250 | A | 9/1999 | Gudat et al. |
| 2002/0117340 | A1 | 8/2002 | Stettner |
| 2002/0143461 | A1* | 10/2002 | Burns et al. .................. 701/117 |
| 2007/0008938 | A1* | 1/2007 | Nebot et al. .................. 370/338 |

OTHER PUBLICATIONS

Algorithmic Foundations of Robotics, Ken Goldberg, Dan Halperin, Jean-Claude Latombe and Randall Wilson, A K Peters, Wellesley, MA, 1995.

International Search Report for PCT/AU2007/001100 completed Oct. 3, 2007.

"Collision Queries using Oriented Bounding Boxes", dissertation by Stefan Gottschalk, University of North Carolina, 2000, 174 pages.

"Collision detection between geometric models: a survey", Ming C. Lin & Stefan Gottschalk, Proc. IMA Conference on Mathmatics of Surfaces, 1998, pp. 1-20.

"Efficient Contact Determination Between Geometric Models", Ming C. Lin & Dinesh Manocha, International Journal of Computational Geometry and Applications, 7(1), 1997, pp. 0-35.

"Exact Collision Checking of Robot Paths", Fabian Schwarzer, Mitul Saha & Jean-Claude Latombe, Springer Tracts in Advanced Robotics, 2004, pp. 25-41.

"A Real-Time Robot Arm Collision Avoidance System", Clifford A. Shaffer & Gregory M. Herb, IEEE Transaction on Robotics and Automation, vol. 8, No. 2, Apr. 1992, pp. 149-160.

"Real-Time Randomized Path Planning for Robot Navigation", James Bruce & Manuela M. Veloso, Springer-Verlag Berlin Heidelberg, 2003, pp. 288-295.

"Configuration Control of a Mobile Dexterous Robot: Real-Time Implementation and Experimentation", David Lim & Homayoun Seraji, The International Journal of Robotics Research, 1997, pp. 601-618.

"Numerical Potential Field Techniques for Robot Path Planning", Jerome Barraquand, Bruno Langlois & Jean-Claude Latombe, IEEE Transactions on Systems, Man and Cybernetics, vol. 22, No. 2, Mar./Apr. 1992, pp. 224-241.

"Time-to-Collision Estimation from Motion Based on Primate Visual Processing", John M. Galbraith, Garrett T. Kenyou & Richard W. Ziolkowski, IEEE Transactions on Pattern Analysis and Machine Intelligence, 2005, pp. 1279-1291.

"Real-Time Collision Avoidance in Teleoperasted Whole-Sensitive Robot Arm Manipulators", Vladimir J. Lumelsky & Edward Cheung, IEEE Transactions on Systems, Man and Cybernetics, vol. 23, No. 1, Jan./Feb. 1993, pp. 194-203.

Real-Time Collision Avoidance for Position-Controlled Manipulators, IEEE Transaction on Robotics and Automation, vol. 15, No. 4, Aug. 1999, pp. 670-677.

"Randomized Kinodynamic Motion Planning with Moving Obstacles", David Hsu, Robert Kindel, Jean-Claude Latombe & Stephen Rock, The International Journal of Robotics Research, vol. 21, No. 3, Mar. 2002, pp. 233-255.

"Stabilizing Impacts in Force-Reflecting Teleoperation Using Distance-to-Impact Estimates", P. R. McAree & R. W. Daniel, The International Journal of Robotics Research, vol. 19, No. 4, Apr. 2000, pp. 349-364.

"A Sensor-Based Robot Transition Control Strategy", Y. F. Li, The International Journal of Robotics Research, vol. 15, No. 2, Apr. 1996, pp. 128-136.

"A Phase Management Framework for Event-Driven Dextrous Manipulation", James M. Hyde & Mark R. Cutkosky, IEEE Transaction on Robotics and Automation, vol. 14, No. 6, Dec. 1998, pp. 978-985.

* cited by examiner

COLLISION AVOIDANCE FOR ELECTRIC MINING SHOVELS

CROSS REFERENCE TO RELATED APPLICATIONS

This application is the U.S. national phase of PCT/AU2007/001100 filed Aug. 6, 2007. PCT/AU2007/001100 claims benefit under the Paris Convention to AU2006904285 filed Aug. 4, 2006. The disclosures of AU2006904285 and PCT/AU2007/001100 are hereby incorporated herein by reference.

FIELD OF THE INVENTION

The present invention relates to systems and methods for collision avoidance and in particular to systems and methods for reducing the probability of a collision between a first object whose trajectory is substantially controlled by an operator input command and a second object.

Embodiments of the invention have been developed primarily for collision control and avoidance in relation to operator controlled machinery, particularly heavy machinery such as electric mining shovels, and particularly relate to the avoidance of collisions between the machinery and secondary objects which, in some cases, are integral to the machinery itself (that is, self-collision and external collision are both able to be avoided). For example, in the context of electric mining shovels, potential collisions might be between a shovel dipper and another part of the shovel machinery, or between the shovel dipper and external obstacles such as truck trays and hoppers. Although embodiments of the invention will be described hereinafter with reference to such applications, it will be appreciated that the invention is not limited as such, and may be readily extended to include control and avoidance of potential collisions in a broader context, both in the fields of heavy machinery and beyond.

BACKGROUND OF THE INVENTION

Any discussion of the background art throughout the specification should in no way be considered as an admission that such background are is prior art that is widely known or forms part of the common general knowledge in the field.

Collisions present a significant risk in the context of the operation of machinery. Traditionally, in cases where machinery is under the control of a human operator, it is the task of that operator to manually avoid collisions.

In more recent times, there has been an increase in automated control of machinery. Such machinery is controlled by automated means, and does not require a human operator. Of course, in absence of a human operator, collision avoidance becomes the responsibility of an automated control system, and various technologies have been developed for collision avoidance in automated control systems.

In spite of the rise in popularity of automated control systems, in many situations, human control continues to present the most appropriate approach, if not the only feasible approach. For example, in some instances technology is not yet sufficiently advanced to allow the automated control of certain machinery for certain tasks. In other instances, although the technology for automated control exists, the costs and/or logistics render such approaches impractical.

The ability of a human operator to manually avoid collisions is inherently limited, for example by factors such as experience, fatigue and the like. Various technologies therefore have been applied to human operated machinery to reduce the risk of collisions, with the general approach being to limit certain otherwise possible movements of the machinery. In the context of electric mining shovels, such technologies include Boom Profiling, which protects against dipper contact with a boom, and Cable Reel Protection, which protects against dipper contact with a cable reeler by inhibiting the machine house from swinging inside a predefined are at the rear of the machine. However, such technologies are relatively rudimentary in the overall scheme of the problems they attempt to solve.

There is a need in the art for systems and methods for reducing the probability of a collision between a first object whose trajectory is substantially controlled by an operator input command and a second object.

DISCLOSURE OF THE INVENTION

According to one aspect of the present invention, there is provided a method of reducing the probability of a collision between a first object, whose trajectory is substantially controlled by an operator input command, and a second object, the method comprising the steps of:
  (i) receiving an operator input command indicative of first control data;
  (ii) generating model data indicative of a virtual construct of the physical environment proximal the first object;
  (iii) processing the first control data to predict future dynamics of the first object in the environment;
  (iv) determining whether, on the basis of the predicted dynamics and the model data, the first object is predicted to collide with a second object in the environment;
  (v) in the case that the first object is predicted to collide with a second object in the environment, defining second control data for which the first object is not predicted to collide with the second object in the environment; and
  (vi) providing the second control data to a controller coupled to the first object such that the first object is controlled in accordance with the second control data for substantially avoiding the collision of the first object with the second object.

One embodiment provides a method wherein the first control data is indicative of a first trajectory direction for the first object and the second control data is indicative of an adjusted trajectory direction for the first object.

One embodiment provides a method wherein the first control data is indicative of a first rate of movement for the first object and the second control data is indicative of a second rate of movement for the first object.

One embodiment provides a method wherein the second rate of movement is slower than the first rate of movement.

One embodiment provides a method wherein a plurality of responses are produced for determining whether, on the basis of the predicted dynamics and the model data, the first object is predicted to collide with a second object in the environment, the method further comprising the step of processing the plurality of responses to determine control dynamics of the first object for which the first object reducing the probability of colliding with the second object in the environment, wherein the second control data is indicative of the control dynamics.

One embodiment provides a method wherein the processing of the plurality of responses is processed by a Model Predictive Control One embodiment provides a method wherein the plurality of responses is generated by a collision control layer and a collision avoidance layer.

One embodiment provides a method wherein the operator input command originates from a human operator.

One embodiment provides a method wherein the method is performed substantially in real time.

One embodiment provides a method wherein the first object comprises a movable component of an item of machinery.

One embodiment provides a method wherein the first object comprises a movable component of an item of heavy machinery.

One embodiment provides a method wherein the first object comprises a shovel component of an electric shovel machine.

Another aspect of the invention provides a computer-readable carrier medium carrying a set of instructions that when executed by one or more processors cause the one or more processors to carry out a method as described above.

Another aspect of the invention provides a system for reducing the probability of a collision between a first object, whose trajectory is substantially controlled by control data, and a second object, the system adapted to implement a method as described above.

Another aspect of the present invention provides a system for reducing the probability of a collision between a first object, whose trajectory is substantially controlled by control data, and a second object, wherein the trajectory of the first object is substantially under operator control, the system comprising:
(i) modelling system for modelling the location of an external environment including one or more the second objects;
(ii) a dynamic prediction system adapted to receiving a first control data indicative of an operator input command for predicting the future location of the first object; and
(iii) an override system coupled to the a dynamic prediction system and the modelling system for generating second control data to override the operator control; the override system is adapted to defining second control data for overriding the first control data control when the dynamic prediction system predicts that the first object may collide with the second object located by the modelling system; the override system is further adapted to providing the second control data to a controller coupled to the first object such that the first object is controlled in accordance with the second control data for substantially avoiding the collision of the first object with the second object.

In one embodiment the first control data is indicative of a first trajectory direction for the first object and the second control data is indicative of an adjusted trajectory direction for the first object.

In one embodiment the first control data is indicative of a first rate of movement for the first object and the second control data is indicative of a second rate of movement for the first object.

A further aspect of the invention provides a method for operating a shovel machine having a human controllable shovel component, the method including the steps of:
(i) receiving first control data indicative of a control command originating from a human operator;
(ii) analysing the first control data to for predicting a collision between the shovel component and a second object;
(iii) in the case that a collision is predicted, defining second control data for which a collision is not predicted;
(iv) providing the second control data to a controller coupled to the shovel component such that the shovel component is controlled in accordance with the second control data.

In one embodiment the second object is part of the shovel machine.

A further aspect of the invention provides a method of reducing the probability of a collision between shovel component of a shovel machine, the trajectory of the shovel component being substantially controlled by an operator input command, and a second object, the method comprising the steps of:
(i) receiving an operator input command indicative of first control data;
(ii) generating model data indicative of a virtual construct of the physical environment proximal the shovel component;
(iii) processing the first control data to predict future dynamics of the shovel component in the environment;
(iv) determining whether, on the basis of the predicted dynamics and the model data, the shovel component is predicted to collide with a second object in the environment;
(v) in the case that the shovel component is predicted to collide with a second object in the environment, defining second control data for which the shovel component is not predicted to collide with the second object in the environment; and
(vi) providing the second control data to a controller coupled to the shovel component such that the shovel component is controlled in accordance with the second control data for substantially avoiding the collision of the shovel component with the second object.

In accordance with a further aspect of the present invention, there is provided a method of implementing collision avoidance, the method comprising the steps of: developing a model of the environment around a moving first object; projecting the likely future dynamics of the first object; determining if the future dynamics of the object are likely to involve a collision; and if a collision is likely to exist, either altering the trajectory direction of the object to avoid the collision or slowing the object. The dynamic location of the object can be normally under human control. The object can comprise an electric mining shovel.

In accordance with a further aspect of the present invention, there is provided a collision avoidance system for reducing the likely consequence of a collision between a first object whose trajectory is normally under human control and a second object, the system comprising: modelling system for modelling an external environment to the first object; dynamic prediction system for predicting the future state of the first object within the model; override system for overriding the human control of the trajectory of the first object when the dynamic prediction system predicts that the object may collide with the second object. The first object can comprise an electric mining shovel.

BRIEF DESCRIPTION OF THE DRAWINGS

Embodiments of the invention will now be described, by way of example only, with reference to the accompanying drawings in which.

DETAILED DESCRIPTION

Figure 1:
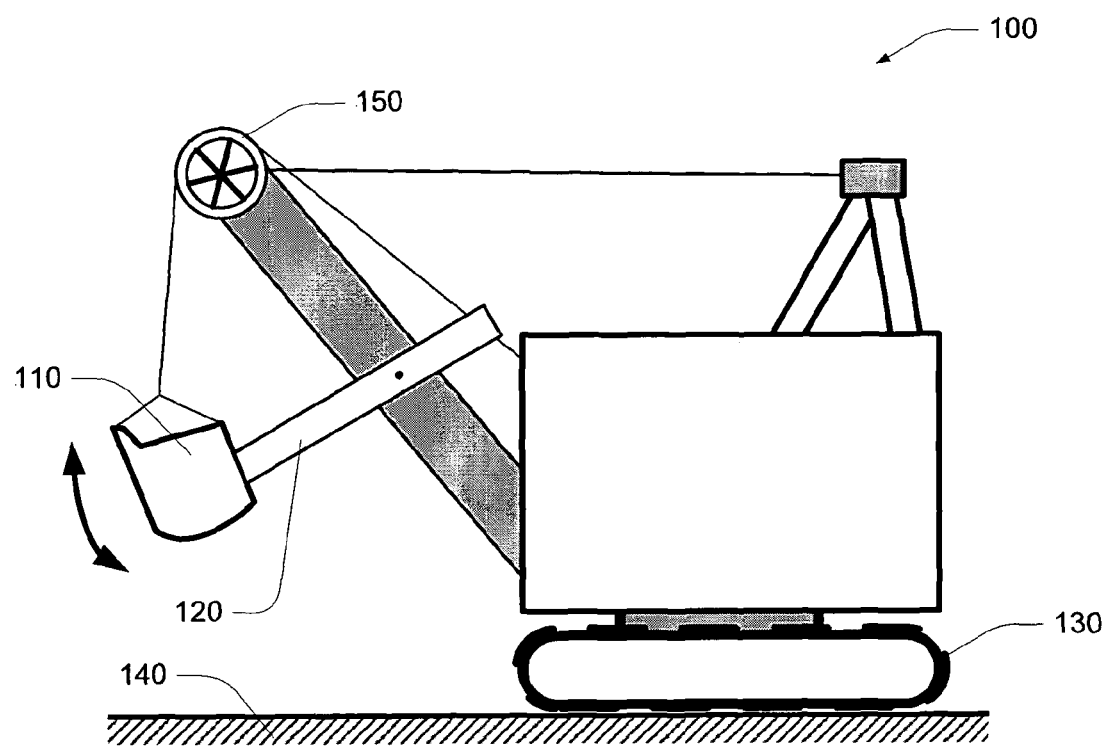
FIG. 1 to FIG. 3 illustrate schematically the operation of an electric mining shovel.

Described herein are systems and method for reducing the probability of a collision between a first object, whose trajectory is substantially controlled by an operator input command, and a second object. In one embodiment such a method includes the steps of receiving an operator input command indicative of first control data; generating model data indicative of a virtual construct of the physical environment proximal the first object; processing the first control data to predict future dynamics of the first object in the environment; determining whether, on the basis of the predicted dynamics and the model data, the first object is predicted to collide with a second object in the environment; defining second control data for which the first object is not predicted to collide with the second object in the environment; and providing the second control data to a controller coupled to the first object such that the first object is controlled in accordance with the second control data for substantially avoiding the collision of the first object with the second object. In some embodiments, such systems or methods are implemented in respect of heavy machinery. For example, in one embodiment the first object is a shovel component of an electric mining shovel machine, and the second object might be another part of the machine (such as a dipper) or an object distinct from the machine.

In overview, the present systems and methods allow for generally unrestrained human control of machinery, with limitations being applied so as to reduce the probability of collisions. In particular, where a collision is predicted based on forward modelling, an operator input command anticipated to result in such a collision is prevented from being directly applied. Instead, the control data of which the command is indicative is modified to define modified command data, wherein based on the modified data the previously anticipated collision is not expected to occur. In some cases this involves altering a trajectory of motion in relation to a movable component of the machinery, and in some cases this might involve a slowing or stopping of a movable component of the machinery.

Receiving an operator input command indicative of first control data generally includes receiving an electronic signal from a joystick and/or other human operable control device. The control data typically includes aspects of direction and magnitude, and is readily translated by a controller component into specific movement commands in respect of the machinery (which might include applying current to a particular component to activate that component).

Generating model data indicative of a virtual construct of the physical environment proximal the first object, in some embodiments, is based on data collected from one or more sensors, such as cameras (and/or stereoscopic camera pairings). Various other sensors including optical and resonance based sensors are used among embodiments. In some cases the input required for generating model data is predefined or provided subject to human involvement.

Processing the first control data to predict future dynamics of the first object in the environment in some cases includes determining, on the basis of the control data and information stored in memory regarding the behaviour of the machinery in question in response to control data, the rate and direction of movement of movable components subject to the control data.

Determining whether, on the basis of the predicted dynamics and the model data, the first object is predicted to collide with a second object in the environment, in some embodiments is based on a three dimensional simulation assessed in a computing system. In other embodiments, this is based on comparison of predicted spatial coordinates for objects at various future times, overlap being indicative of a collision.

It will be appreciated that the general approaches taught herein allow for the application of a collision avoidance protocol in respect of human controlled machinery, this protocol being substantially transparent to a human user. That is, a human user is free to control machinery in the usual fashion, and "unusual" (i.e. modified) control characteristics are only observed in the event that a collision is predicted.

Collision avoidance for human operated heavy machinery introduces complications including the presence of a human operator in-the-loop, and managing the significant kinetic energy that must be generated and regenerated to manoeuvre a shovel.

In regard to the presence of a human operator in-the-loop, the present embodiments function such that the operator continues to have overall control of a machine such that any collision control and avoidance systems provide operator assistance functionality to the operation of the shovel rather than taking over complete control. The interventions of the collision control/avoidance system are substantially transparent to the operator. The collision control and avoidance system in this way should not essentially restrict the operator from operating the machine in the intended fashion, and yet is able to adapt in real-time to remedy any problematic control instructions thereby avoid collision.

This recognizes that operators frequently operate shovels close to their performance limits, and a collision control/avoidance systems should not limit a skilled operator's control of the shovel (this would arguably be detrimental to the operator's productivity during a shift).

In relation to managing the significant kinetic energy that must be generated to manoeuvre a shovel, the electrical drives are limited in the rate at which they can regenerate. For example, significant kinetic energy must be regenerated through the electrical drives in order to bring the dipper to a stop. Therefore a system will preferably look ahead and plan future actions to ensure that the regeneration is initiated in sufficient time to stop the dipper before it collides. The existing control systems on mining shovels do not consider the future implications of current control actions and so are unable to make decisions on when to regenerate.

Some of the present embodiments, when applied to shovel machinery, account for the continued improvement of shovel performance whereby the need for collision avoidance has become increasingly more important with the ongoing imperative to increase shovel speeds by installing more powerful drive systems and employing technology enhancements such as dynamic field weakening. Higher operating speeds equate to a high probability of collision and to a higher likelihood of damage on collision.

Figure 2:
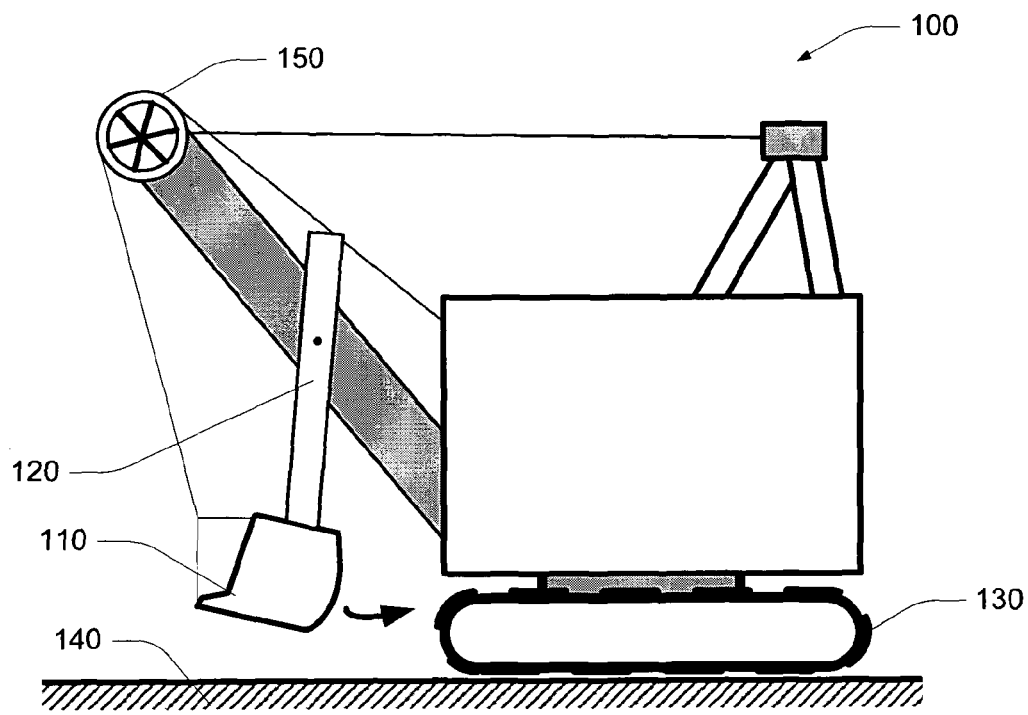
Figure 3:
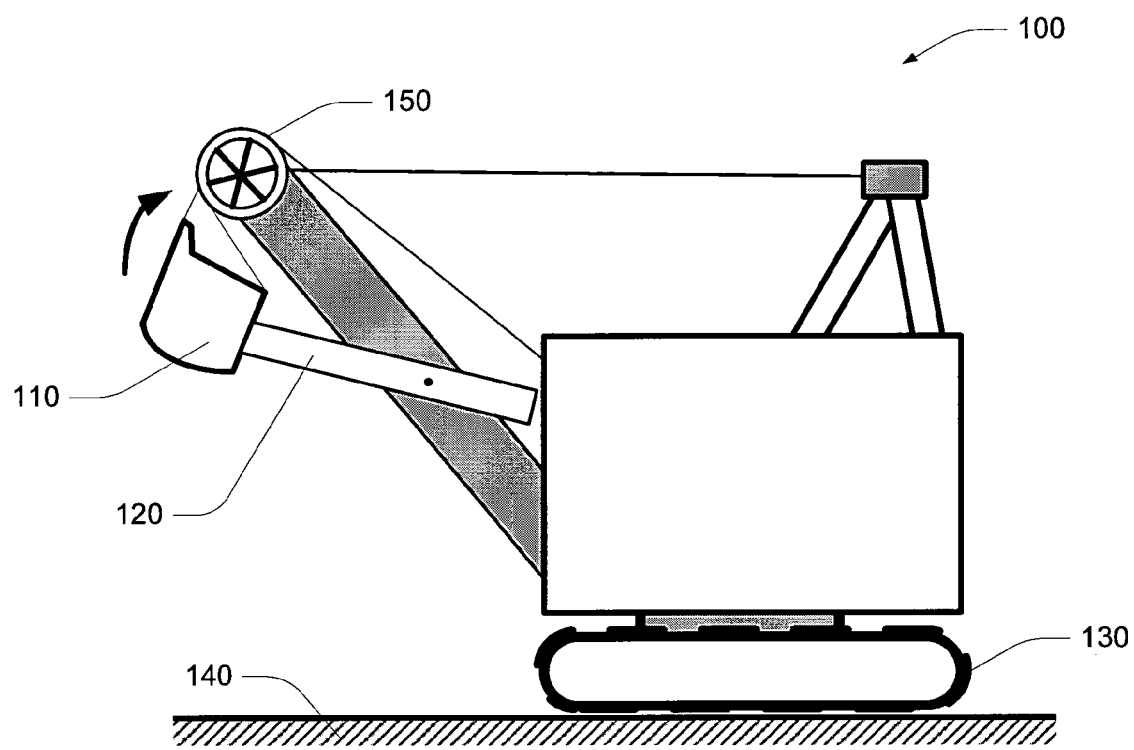

FIG. 1 to FIG. 3 schematically illustrate a typical electric mining shovel machine 100. This mining shovel machine is schematically depicted as including a movable shovel component 110, which is attached to one end of a dipper 120, the dipper being movably mounted with respect to the shovel component.

Dipper collisions are unintended impacts between the dipper 120 and other objects, either other parts of the shovel component 110 (self collisions) or other objects in the shovel machine's environment (external collisions). The most common instances are where the dipper 120 collides with either crawler-tracks 130 or the floor 140 during a 'return-to-tuck' phase of the shovel cycle, as best shown in FIG. 2. Other instances include collisions between the dipper 120 and the cable reeler 150, as best shown in FIG. 3, which typically occur at end-of-shift change-overs when the dipper is set down towards the rear of the shovel machine. Examples of external collisions are between the dipper 120 and a truck-tray or hopper (not shown) during loading.

Dipper collisions are typically the result of operator misjudgment. The desire that operators should avoid all collisions over 12 hour shifts without supporting technology is difficult to implement. Even good operators have lapses in judgement and/or concentration occasionally, and typically a competent and experienced operator is likely to impact the dipper once or twice per shift. It is anticipated that a trainees would do so more frequently.

Dipper collisions are important to control/avoid because at impact, significant energy must be absorbed by the shovel structure. By way of example, a fully laden 4100XPB shovel manufactured by P&H Mining Equipment will have an effective mass of approximately 200,000 kg (combined mass of the handle, dipper, and payload), whose centre of gravity may be 10 metres from the swing axis and moving at up to 3 metres per second. The kinetic energy to be dissipated on impact is of the order of 1 MJ (equivalent to 1 tonne car travelling at 161 km/hr). At impact, this energy is converted to an impulsive force. In a collision with a truck tray, the duration of this impulse might be 2 seconds, in which case the average force between the dipper and the truck tray would be 0.6 MN with peak forces likely to extend to 3 to 5 MN or higher.

For collisions between the dipper 120 and the crawler-tracks 130 (for example as shown in FIG. 2), the kinetic energy to be dissipated is usually less that 0.1 MJ (the dipper is empty and speed is lower), but because of the higher effective stiffness of the colliding bodies, the duration of the impact is usually much smaller and the peak forces can still extend to 3 to 5 MN. The usual immediate consequence of a crawler-track collision is the displacement of one or more crawler shoes, but incremental damage is done to all components through which the reaction force passes. This includes the handle, the crowd transmission, the car-body structure, and the swing transmission. For this reason, dipper collisions are among the most damaging events that a shovel sees in regular operation. Even comparatively minor impacts typically place the handle and crowd transmission in a high state of stress.

Various embodiments considered herein in the context of shovel machinery deal with the following:

Prediction of the likelihood of impacts between the dipper and various objects, whether those object are internal (other parts of the shovel) or external (truck trays or hoppers).

Determination of how to slow the shovel or redirect the dipper trajectory to avoid any impact whilst respecting the motion capabilities of the machine.

Provision of the above capabilities in a transparent form to the operator without otherwise imposing or interfering with their command of the shovel.

To address these aspects, an embodiment utilises modern control theory and, in particular, Model Predictive Control methods (MPC). This embodiment distinguishes between the functionality to stop collisions occurring by slowing the dipper prior to impact—collision control—and that of avoiding collisions by altering the trajectory of the dipper, an important element in the continued improvement of shovel performance—collision avoidance.

Figure 4:
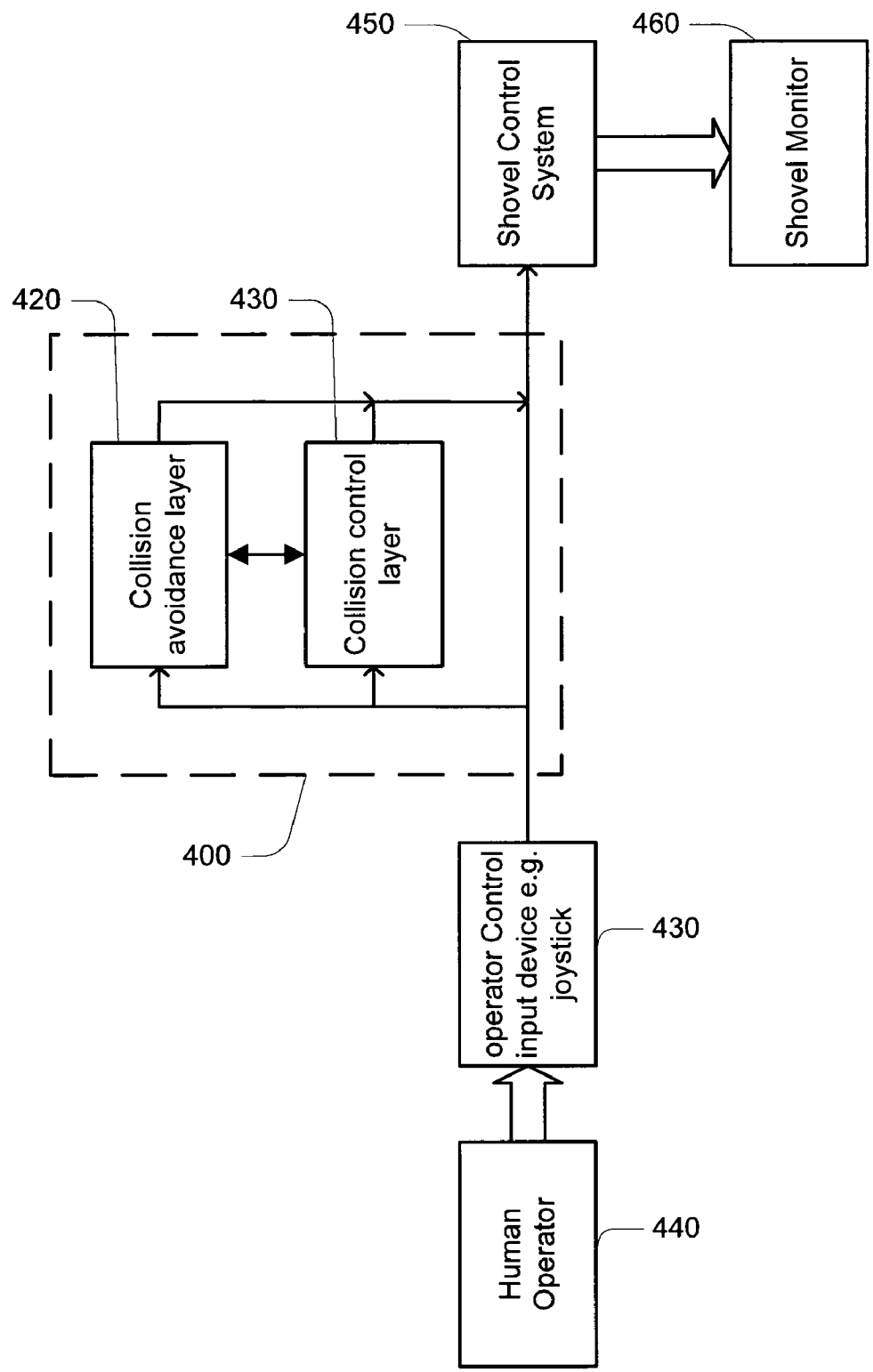
FIG. 4 is an exemplary functional block diagram of the control portions of an electric mining shovel in accordance with one embodiment.

Referring to FIG. 4, there is shown an exemplary schematic depiction of a collision control and avoidance system according to one embodiment and the interaction of that system between a human operator and drive control systems of a shovel machine, such as machine 100. In this embodiment, a collision prevention system 400 has two layers; the first layer 410 being for collision control and the second layer 420 for collision avoidance. Both layers are intended to reduce the frequency and severity of collisions but provide different functionality. In particular, the collision avoidance layer 420 builds on capability provided by the collision control layer 410. Both layers intercept the joystick references 430 corresponding to commands from the human operator 440 and, where appropriate, modify these commands to reduce the probability of collisions.

The collision control layer 410 becomes active only when collisions are predicted to occur based on the current motion of the dipper 120. Where no collision is predicted, the operator references essentially pass unaltered to the shovel control system and drive mechanisms 450 and the shovel responds in a conventional way to operator commands.

In one embodiment, an objective of the collision control layer 410 is to substantially bring the dipper to a stop by regenerating its kinetic energy through the shovel's electrical drives when it deems that a collision would otherwise occur.

In one embodiment, the objective of the collision avoidance layer 420 is to modify commands stemming from human control interactions (use of an the operator's joysticks 430, for instance) so as to avoid predicted collisions without having to bring the dipper to a stop, and, by implication, without imposing the consequential increase in cycle-time brought about by stopping the dipper. This collision avoidance layer operates in a shared control mode in which the operator maintains control over the shovel's swing motion while the on-board computer system alters the crowd and hoist motion of the dipper 120 to avoid collisions.

In some embodiments, the collision avoidance layer 420 assists the operator to avoid most collisions by automatically and in a manner substantially transparent to the operator adjusting movements of dipper 120 as opposed to those that would ordinarily result from the supplied operator input. The collision control layer 410 works together with the collision avoidance layer 420 to bring the dipper 120 to a stop when a feasible dipper motion avoiding the potential collision cannot be found.

The methodology employed in collision prevention system 400 to simultaneously deal with both the collision control layer 410 and the collision avoidance layer 420 is Model Predictive Control (MPC). The method is computationally demanding but continual improvement in computer technology has made it possible for use in the real-time control of mining equipment.

Model Predictive Control is able to select control actions that are predicted to lead to a suitable outcome over a limited control horizon and to update control decisions continually in real-time as the operator's commands change. In some embodiments this horizon moves forward over time, essentially allowing for real-time analysis.

In some embodiments, Model Predictive Control provides for any one or more of the following:

The control action being dependent on predicted behaviour, e.g. the distance to collision. This form of prediction is essential to avoiding collisions.

The predicted behaviour being computed using a model of the shovel that includes both geometry of the shovel in which the system is installed and the dynamics of its range of motion capabilities.

The operator's commands determined from the joystick references being considered and compared against the geometry and dynamics of the shovel for their future implications in real-time and are altered before being passed to the shovel control system so that collision does not occur. Either bringing the dipper to a stop or altering its trajectory achieves this.

A continuous process is implemented such that the control horizon recedes into the future and the altered command at any time uses the most up-to-date information available.

In one embodiment of the collision prevention system, a dedicated computer hardware platform is required to run the control algorithms. A suitable system in some instances includes one that is based on the PC104 and EBX computer specifications. Such a system desirably has significant computational capability and is suitable for the presently considered level of processing.

Figure 5:
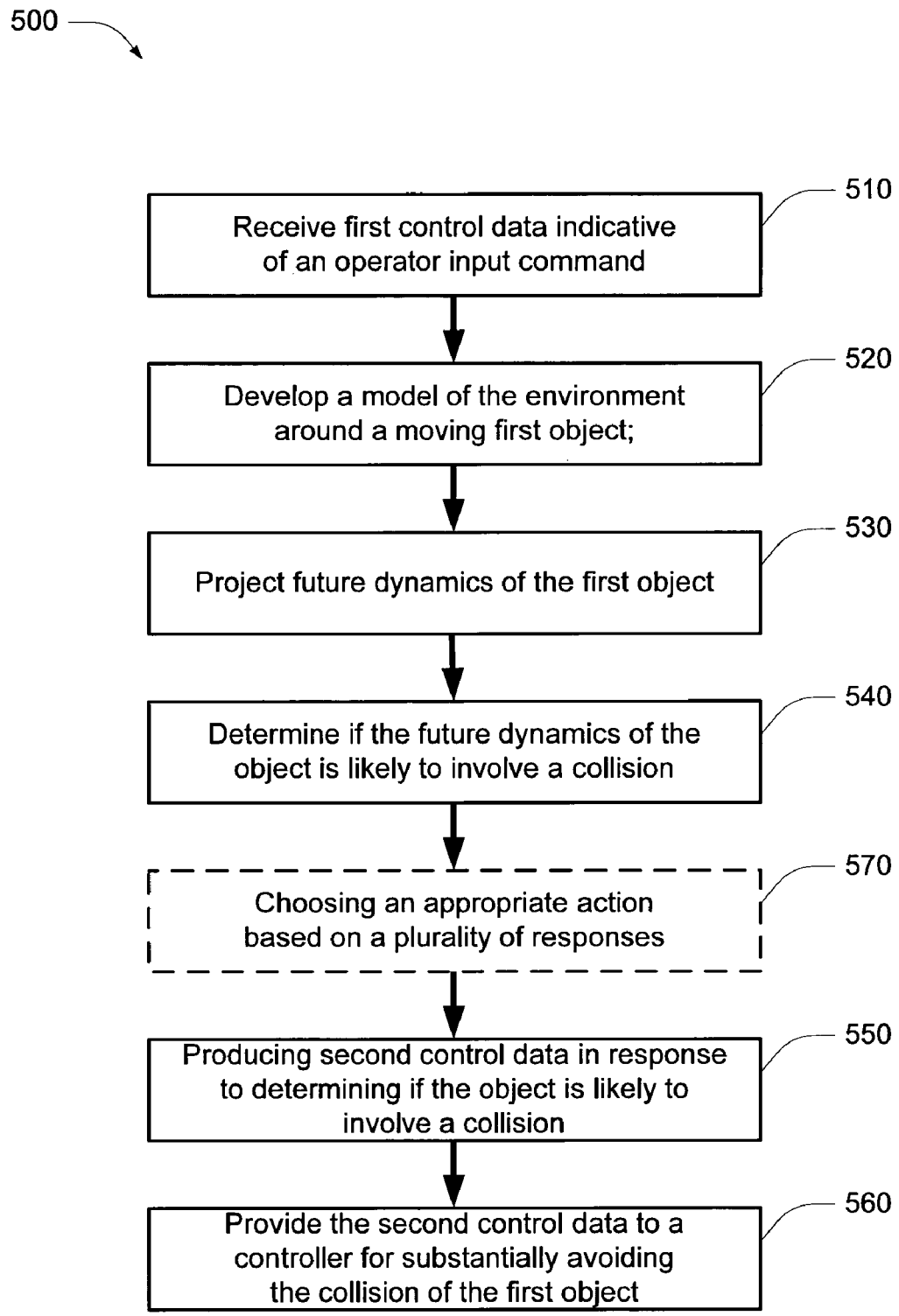
FIG. 5 is an exemplary flowchart of the steps in implementing one embodiment.

Referring to FIG. 5, in an embodiment a method of implementing collision avoidance 500 comprises the steps of:
(a) receiving first control data indicative of an operator input command (step 510);
(b) generating model data for the environment around a first object (step 520);
(c) predicting future dynamics of the first object (step 530);
(d) determining if the future dynamics of the first object is likely to involve a collision (step 540);
(e) defining second control data for which the first object is not likely to involve a collision (step 550); and
(f) providing the second control data to a controller for substantially avoiding the collision of the first object (step 560).

Predicting the future dynamics of the first object is intended to predict the location of the object at one or more future time instances. In an embodiment the first object is the shovel component of an electric mining shovel machine.

The model data generated for the environment around a first object is intended to predict the location of other objects in the environment at one or more future time instances. In an embodiment these objects include elements of an electric mining shovel machine that might come in contact with the shovel component or other objects external to the electric mining shovel, for example the ground.

The second control data is, in some embodiments, indicative of altering a trajectory direction of the object, or slowing the object, to avoid the collision. Where first control data is indicative of a first trajectory direction for the first object, second control data indicative of an adjusted trajectory direction can be generated for controlling first object. Where first control data is indicative of a first trajectory direction for the first object, second control data indicative of an adjusted trajectory direction can be generated for controlling the first object. Where the first control data is indicative of a first rate of movement for the first object, a second control data indicative of a second rate of movement can be generated for controlling the first object.

In some embodiments, a plurality of responses determining if the object is likely to involve a collision are concurrently provided by the collision control layer and a collision avoidance layer. In this embodiment, an appropriate action can be selected 570 by using Model Predictive Control.

In an embodiment, the Model Predictive Control based methodology of the system typically requires a three-dimensional computer representation of the geometry of the shovel in order to make predictions of future impacts. It will be appreciated that the computer representation of the shovel must be a fit-for-purpose model of the particular electromechanical system of the shovel into which the system is to be implemented. This is required to make predictions about when control action is required to avoid a dipper collision.

For machines designed using 3D-CAD packages, such as for example the 4100XPBs manufactured by P&H Mining Equipment, the required computer representations of the geometric models can be simply extracted from the existing CAD models and imported into the collision control and avoidance systems. Mining shovels that were developed prior to the introduction of 3D-CAD tools, such as for example, the 2100BLE was manufactured in 1987 by P&H Mining Equipment, it will be appreciated that suitable 3D-CAD models of the major assemblies including the dipper, handle, boom, machine-house, crawler-tracks, and cable-reeler can be recreated from the original manufacturing drawings read into the collision control module.

On the basis of the geometric models and real-time data input from the control systems of the shovel, some embodiments are capable of anticipating a future self-collision or collision between the dipper and the floor from the operator's current control actions.

Accordingly, some embodiments establish, in real-time, the latest possible time at which regeneration can occur in order to stop the dipper based on projections of current motion to provide the capability to stop the shovel dipper and prevent a shovel collision that would otherwise have occurred.

In an embodiment, appropriate methodology for altering operator commands to avoid collisions is achieved within the Model Predictive Control framework and includes a number of control methodologies such as:
The use of suitable numerical criteria or cost functions for judging which action is best at any given instant. An obvious cost function is minimum time, however, other functions are suitable.
Provision of a framework for dealing with constraints such as the geometric constraints associated with the physical form of the shovel.
Real-time operation.

Figure 6:
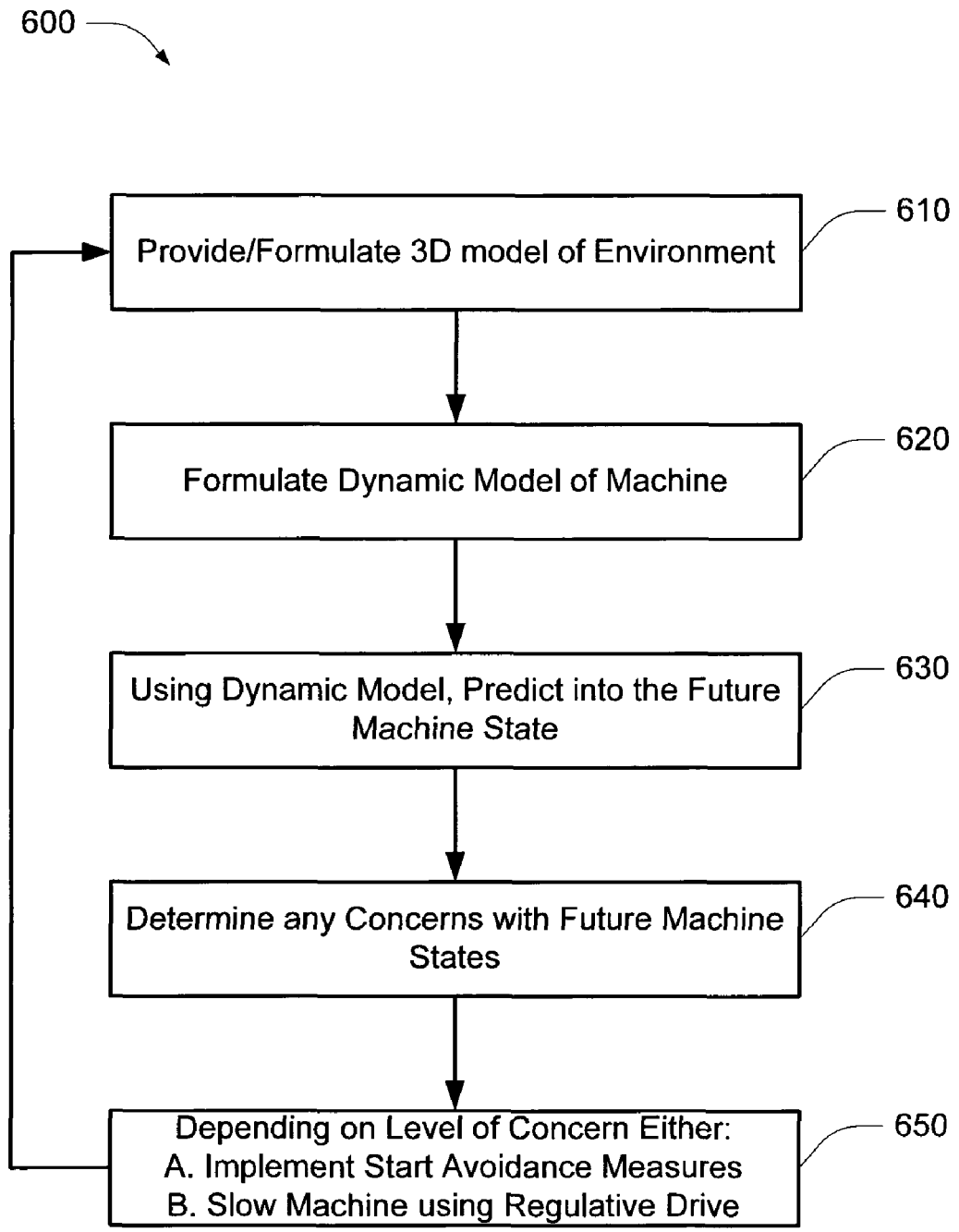
FIG. 6 is an exemplary flowchart of the steps in implementing one embodiment.

FIG. 6 shows, by way of example only, a flow chart 600 implemented by the collision avoidance layer 410 and collision control layer 420 (as shown in FIG. 4), which includes the following steps:
(i) A 3-dimensional model of the environment proximal the shovel is created utilising appropriate sensor equipment (step 610).
(ii) A full dynamic model of the current state of the machine is created (step 620)
(iii) Next, utilising the full dynamic model, project into the future the most likely machine state (step 630);
(iv) Next, determine any likely future concerns with the projected future machine state in relation to the probability of a collision (step 640).
(v) Next, depending on the level of concern on the probability of collision, either apply regenerative breaking to the current machine or provide collision avoidance measures (step 650).

These steps are continuously repeated, substantially in real time.

It will be appreciated that the embodiments described above provide a significant advance in the state-of-the art in shovel automation technologies, with specific emphasis on collision control and avoidance. It should further be appreciated that such systems and methods are scaleable to mining shovels of substantially any size and from any manufacturer. The application of embodiments to other types of shovels will be straightforward, although may require significant modification of the control systems of those machines and corresponding modifications to the system, however these modifications will be readily apparent to those skilled in the art.

Figure 7:
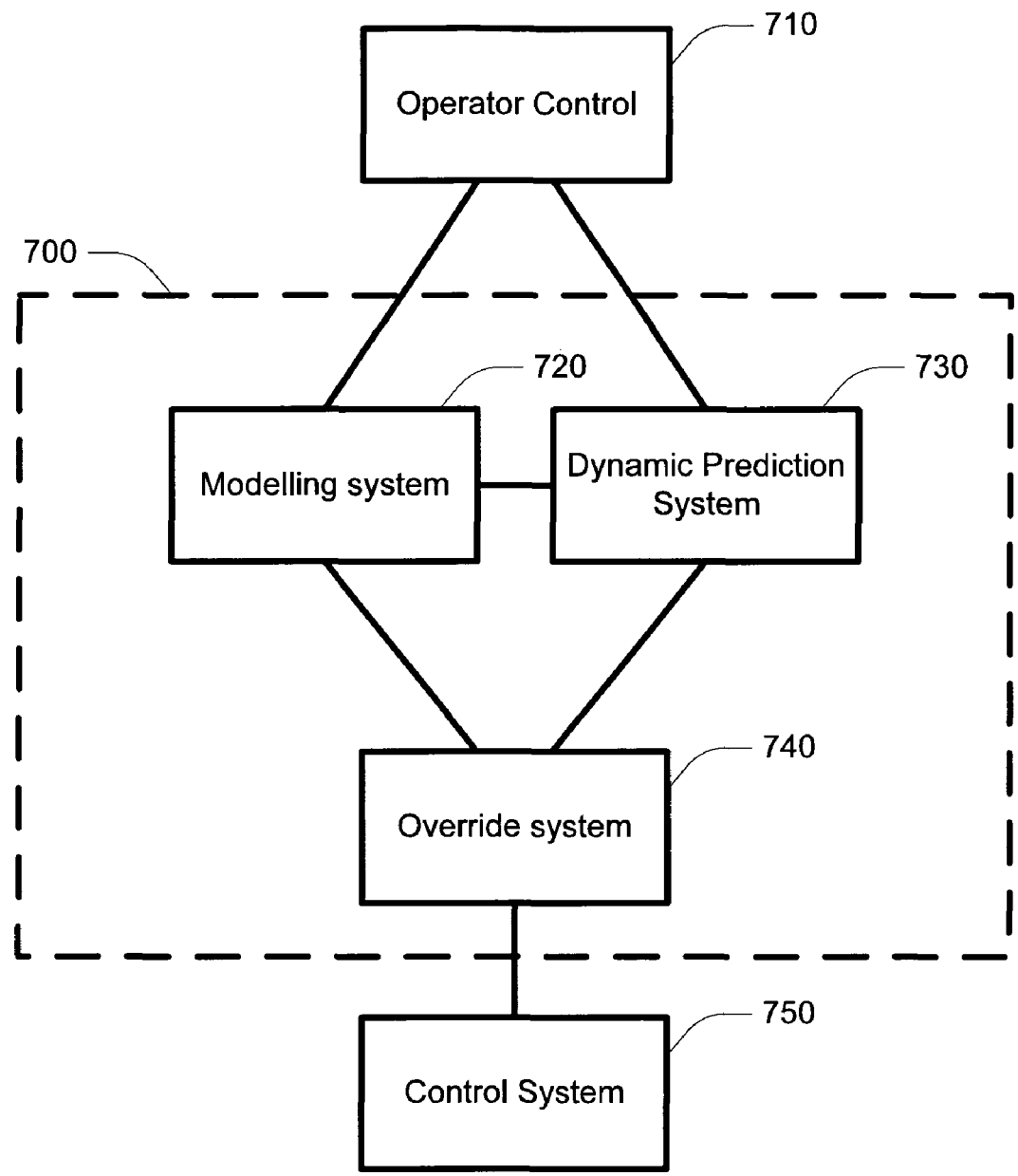
FIG. 7 is an exemplary system according to one embodiment.

Referring to FIG. 7, an exemplary embodiment is shown of a collision avoidance system 700 for reducing the probability of a collision between a first object and a second object, wherein the trajectory of the first object is substantially under human control by first control data.

This system receives a first control data indicative of an operator's control from an operator control module 710. The systems comprises:
  (i) A modelling system 720 for modelling an external environment to the first object.
  (ii) A dynamic prediction system 730 for predicting the future state of the first object within the model.
  (iii) A override system for overriding the human control of the trajectory of the first object when the dynamic prediction system predicts that the object may collide with the second object.

The override system produces a second control data for substantially avoiding the collision of the first object, and provides this second control data to a control system 750. Preferably the override system is adapted to perform a Model Predictive Control for choosing an appropriate action.

In an embodiment, the second control data is indicative of altering a trajectory direction of, or slowing, the object to substantially avoid the collision.

The various embodiments of the collision control and avoidance systems described above offer immediate benefit to assist shovel operators and decrease the incidence of machine damage and achieve higher productivity. The benefits of various embodiments include:
  Safer machine operation by reducing the potential for collisions.
  Reduction of machine duty by minimizing the damage resulting from impacts.
  Improved machine reliability through a reduction in the frequency and severity of high duty collision events.
  Providing a safer working environment for operators by reducing the frequency of impacts.
  Consistent cycle time reduction by allowing operators to operate the machine at higher swing speeds with lower risk of collision.
  Enhancement of existing machine protection systems, in particular, cable reel and boom protection.
  Improvement of productivity by reducing downtime resulting from equipment damage.

It will be appreciated that the illustrated collision prevention system and methods provide for substantially that minimizing the frequency and severity of collisions involving electric mining shovels.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

Thus, one embodiment of each of the methods described herein is in the form of a computer-readable carrier medium carrying a set of instructions, e.g., a computer program that are for execution on one or more processors, e.g., one or more processors that are part of building management system. Thus, as will be appreciated by those skilled in the art, embodiments of the present invention may be embodied in a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

REFERENCES

The following references are thought to provide some additional context to the technology related to the present embodiments.

There exists well-established algorithms for detecting intersections between moving objects, computing the minimum distance between a pair of objects, and computing the closest features (e.g. edges, vertices, faces) for a pair of objects, see for example: S. Gottschalk. Collision Queries using Oriented Bounding Boxes, PhD Thesis Department of Computer Science, UNC Chapel Hill, 2000; M. Lin and S. Gottschalk. Collision Detection between Geometric Models: A Survey. Proc. IMA Conference on Mathematics of Surfaces, 1998; M. Lin and D. Manocha. Efficient Contact Determination Between Geometric Models. Int. J. of Computational Geometry and Applications, 7(1), pp. 123-151, 1997; and F. Schwarzer, M. Saha, and J. C. Latombe, Exact Collision Checking of Robot Paths. In Algorithmic Foundations of Robotics V, J. D. Boissonnat, J. Burdick, K. Goldberg, and S. Hutchinson (eds.), Springer Tracts in Advanced Robotics, Springer, pp. 25-41, 2004.

There are also known methods exist for planning collision free paths in arbitrarily complex environments, see for example: J. C. Latombe Robot Motion Planning. Kluwer Academic Publishers, Boston, Mass., 1991 and K. Goldberg, D. Halperin, J. C. Latombe, and R. H. Wilson Algorithmic Foundations of Robotics. (eds.). AK Peters, Wellesley, Mass., 1995.

Known methods exist for altering the path and velocity of a robot in real-time to avoid impacts, see for example: Shaffer C A, Herb G M. A real-time robot arm collision avoidance system. IEEE Trans. Robotics and Automation. 8 (2): 149-160. 1992; Bruce J, Veloso M M. Real-time randomized path planning for robot navigation Lecture notes in Artificial Intelligence. 2752: 288-295. 2003; Lim D, Seraji H. Configuration control of a mobile dexterous robot: Real-time implementation and experimentation. Int. J. Robotics Research. 16 (5): 601-618. 1997; Barraquand, B. Langlois, and J. C. Latombe. Numerical Potential Field Techniques for Robot Path Planning. IEEE Transactions on Systems, Man, and Cybernetics, 22(2):224-241. 1992; Galbraith J M, Kenyon G T, Ziolkowski R W. Time-to-collision estimation from motion based on primate visual processing IEEE Trans. Pattern Analysis and Machine Intelligence. 27 (8): 1279-1291. 2005; Lumelsky V J, Cheung E. Real-time collision avoidance in teleoperated whole-sensitive robot arm manipulators. IEEE Trans. Systems, Man, and Cybernetics, 23 (1): 194-203. 1993; Seraji H. Real-time collision avoidance for position-controlled manipulators. IEEE Trans. Robotics and Automation. 15 (4): 670-677.1999; and Hsu D, Kindel R, Latombe J C, et al. Randomized kinodynamic motion planning with moving obstacles. Int. J. Robotics Research. 21 (3): 233-255. 2002. It would be appreciated that in these examples real-time is defined as instantaneous commencement of processing information in a continuous stream, as opposed to post-processing "after the fact".

Controlling the transition of a robot end-effector from free-space motion to constrained contact with its environment is also known, for example: McAree P R, Daniel R W. Stabilizing impacts in force-reflecting teleoperation using distance-to-impact estimates. Int. J. Robotics Research. 19 (4): 349-364. 2000; Li Y F. A sensor-based robot transition control strategy. Int. J. Robotics Research. 15 (2): 128-136. 1996; and Hyde J M, Cutkosky M R. A phase management framework for event-driven dextrous manipulation. IEEE Trans. Robotics and Automation. 14 (6): 978-985. 1998.

The claims defining the invention are as follows:

1. A method of reducing the probability of a collision between a shovel component of a shovel machine, whose trajectory is substantially controlled by an operator input command, and a second object, the method comprising:
    receiving an input command indicative of first control data from a human operator;
    generating model data indicative of a virtual construct of the physical environment proximal the shovel component;
    processing the first control data to predict future dynamics of the shovel component in the environment;
    determining whether, on the basis of the predicted dynamics and the model data, the shovel component is predicted to collide with a second object in the environment;
    in the case that the shovel component is predicted to collide with a second object in the environment, modifying the first control data to define second control data for which the shovel component is not predicted to collide with the second object in the environment; and
    providing the second control data to a controller coupled to the shovel component such that the shovel component is controlled in accordance with the second control data for substantially avoiding the collision of the shovel component with the second object, the controller substantially bringing the shovel component to a stop by regenerating kinetic energy through an electric drive associated with the shovel component when a collision would otherwise occur.

2. A method according to claim 1 wherein processing the first control data to predict future dynamics of the shovel component in the environment comprises processing first control data indicative of a first trajectory direction for the shovel component and defining second control data for which the shovel component is not predicted to collide with the second object in the environment comprises defining second control data indicative of an adjusted trajectory direction for the shovel component.

3. A method according to claim 1 wherein processing the first control data to predict future dynamics of the shovel component in the environment comprises processing first control data that is indicative of a first rate of movement for the shovel component and defining second control data for which the shovel component is not predicted to collide with the second object in the environment comprises defining second control data indicative of a second rate of movement for the shovel component.

4. A method according to claim 3 wherein processing first control data indicative of a first rate of movement for the shovel component and defining second control data indicative of a second rate of movement for the shovel component together comprise processing first control data indicative of a first faster rate of movement for the shovel component and defining second control data indicative of a second slower rate of movement for the shovel component.

5. A method according to claim 1 wherein determining whether, on the basis of the predicted dynamics and the model data, the shovel component is predicted to collide with a second object in the environment comprises producing a plurality of responses for determining whether, on the basis of the predicted dynamics and the model data, the shovel component is predicted to collide with a second object in the environment, the method further comprising processing the plurality of responses to determine control dynamics of the shovel component for which the shovel component reducing the probability of colliding with the second object in the environment, wherein the second control data is indicative of the control dynamics.

6. A method according to claim 5 wherein the processing of the plurality of responses comprises processing of the plurality of responses using a Model Predictive Control.

7. A method according to claim 5 wherein producing a plurality of responses comprises generating the plurality of responses using a collision control layer and a collision avoidance layer.

8. A method according to claim 1 of reducing the probability of a collision between a shovel component and a second object substantially in real time.

9. A method according to claim 1 of reducing the probability of a collision between a movable component of an item of machinery and a second object.

10. A method according to claim 1 of reducing the probability of a collision between a movable component of an item of heavy machinery and a second object.

11. A method according to claim 1 of reducing the probability of a collision between a shovel component of an electric shovel machine and a second object.

12. A non-transitory computer-readable carrier medium carrying a set of instructions that when executed by one or more processors cause the one or more processors to carry out a method according claim 1.

13. A system for reducing the probability of a collision between a shovel component of a shovel machine, whose trajectory is substantially controlled by control data, and a second object, the system adapted to receive an input command indicative of first control data from a human operator;
    to generate model data indicative of a virtual construct of the physical environment proximal the shovel component;
    to process the first control data to predict future dynamics of the shovel component in the environment;

to determine whether, on the basis of the predicted dynamics and the model data, the shovel component is predicted to collide with a second object in the environment;

in the case that the shovel component is predicted to collide with a second object in the environment, to modify the first control data to define second control data for which the shovel component is not predicted to collide with the second object in the environment; and to provide the second control data to a controller coupled to the shovel component such that the shovel component is controlled in accordance with the second control data for substantially avoiding the collision of the shovel component with the second object, the controller substantially bringing the shovel component to a stop by regenerating kinetic energy through an electric drive associated with the shovel component when a collision would otherwise occur.

14. A method for operating a shovel machine having a human controllable shovel component, the method including:

receiving first control data indicative of a control command originating from a human operator;

analyzing the first control data to predict a collision between the shovel component and a second object;

in the case that a collision is predicted, defining second control data for which a collision is not predicted;

providing the second control data to a controller coupled to the shovel component and controlling the shovel component in accordance with the second control data the controller substantially bringing the shovel component to a stop by regenerating kinetic energy through an electric drive associated with the shovel component when a collision would otherwise occur.

15. A method according to claim 14 wherein analyzing the first control data to predict a collision between the shovel component and a second object comprises analyzing the first control data to predict a collision between the shovel component and a part of the shovel machine.

16. A method of reducing the probability of a collision between shovel component of a shovel machine, the trajectory of the shovel component being substantially controlled by a human operator input command, and a second object, the method comprising:

receiving a human operator input command indicative of first control data;

generating model data indicative of a virtual construct of the physical environment proximal to the shovel component;

processing the first control data to predict future dynamics of the shovel component in the environment;

determining whether, on the basis of the predicted dynamics and the model data, the shovel component is predicted to collide with a second object in the environment;

in the case that the shovel component is predicted to collide with a second object in the environment, modifying the first control data to define second control data for which the shovel component is not predicted to collide with the second object in the environment; and providing the second control data to a controller coupled to the shovel component such that the shovel component is controlled in accordance with the second control data for substantially avoiding the collision of the shovel component with the second object, the controller substantially bringing the shovel component to a stop by regenerating kinetic energy through an electric drive associated with the shovel component when a collision would otherwise occur.

* * * * *